United States Patent [19]

Ebert et al.

[11] Patent Number: 4,707,019
[45] Date of Patent: Nov. 17, 1987

[54] MOUNTING HOUSING FOR SUN VISOR FOR VEHICLES

[75] Inventors: Charles Ebert, Luxeuil, France; Hermann Krehl, Baden-Baden; Lothar Viertel, Berus, both of Fed. Rep. of Germany; Bernard Hilbert, Cappel, France; Rüdiger Walter, Ladenburg, Fed. Rep. of Germany

[73] Assignee: Gebr. Happich GmbH, Fed. Rep. of Germany

[21] Appl. No.: 4,330

[22] Filed: Jan. 15, 1987

[30] Foreign Application Priority Data

Jan. 22, 1986 [DE] Fed. Rep. of Germany ....... 3601761

[51] Int. Cl.$^4$ ............................................... B60J 3/02
[52] U.S. Cl. .................................... 296/97 K; 362/61
[58] Field of Search ................ 296/97 K, 97 R, 97 H; 362/61, 74

[56] References Cited

U.S. PATENT DOCUMENTS 4,469,367  9/1984  Kuttler et al. ................. 296/97 K
4,610,477  9/1986  Ebert et al. ..................... 296/97 K
4,617,699 10/1986  Nakamura ....................... 296/97 K

FOREIGN PATENT DOCUMENTS 2431931  3/1980  France .
2445777  9/1980  France .

Primary Examiner—Robert R. Song
Attorney, Agent, or Firm—Ostrolenk, Faber, Gerb & Soffen

[57] ABSTRACT

A sun visor for vehicles is provided at one corner thereof with a mounting housing for connecting the sun visor to a sun visor shaft which is mounted to the vehicle. The mounting housing is embedded in the plastic foam material of the sun visor and is secured to a stiffening wire insert which extends therethrough. A first insertion opening is defined in the mounting housing for receiving the stiffening insert and a second insertion opening is provided for supporting a leaf spring and for receiving the sun visor shaft. The spring bears against the shaft to prevent unwanted rotation of the sun visor about the shaft.

21 Claims, 6 Drawing Figures

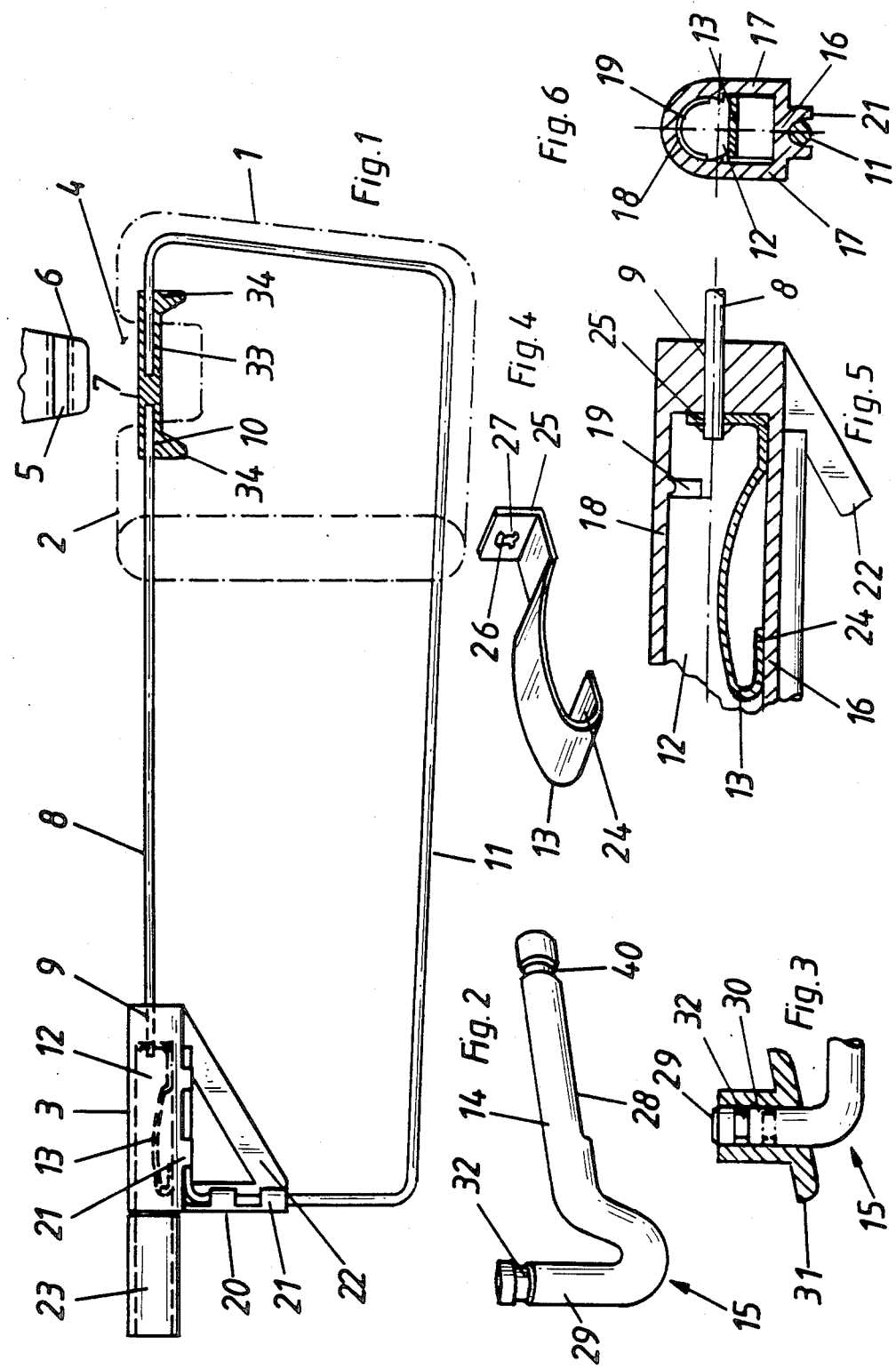

MOUNTING HOUSING FOR SUN VISOR FOR VEHICLES

BACKGROUND OF THE INVENTION

The present invention is related to a sun visor for vehicles, and more particularly to the mounting housing for the sun visor. The sun visor is of the type having a generally rectangular, flat sun visor body which is formed of foam plastic and stiffened by a stiffening insert. The mounting housing, which receives the vehicle sun visor support shaft from the vehicle, is located at one corner of the sun visor body and within the foam plastic and is secured to the stiffening insert. The mounting housing holds a spring which exerts a frictional force on the sun visor shaft to prevent unwanted rotation of the sun visor body about the shaft.

A sun visor of the foregoing type is described in European Pat. Nos. 00 68 269 and 00 53 529.

SUMMARY OF THE INVENTION

It is an object of the present invention to provide a simpler and less expensive sun visor of the aforementioned type. In particular, the present invention aims to provide improvements in the mounting housing and in the spring supported therein.

The foregoing and other objects of the present invention are realized in an improved mounting housing. At one longitudinal end, the housing includes a first insertion opening for receiving an end region of the stiffening insert which is formed of a length of wire. At its other end, the housing includes a second insertion opening of a larger cross-section which accommodates both the spring and one end of the sun visor support shaft. The two insertion openings in the mounting housing are longitudinally aligned and communnicate with one another.

The second insertion opening which receives the spring is defined by a bottom wall, two side walls extending perpendicularly to the bottom wall and a semicircular top wall having a curvature which matches the curvature of the shaft of the sun visor shaft.

The spring is of the leaf spring type and includes at one end a spring tongue formed of a leaf section which is bent about 180° behind the rest of the spring to provide a rest portion which rests on the bottom wall of the insertion opening. The other end of the leaf spring is bent upwardly about 90° to form a strap that extends across the second opening and passes the first opening. An insertion hole formed in the strap is designed to receive one end of one of the wires, of which the stiffening insert is formed. Between its strap and tongue, the spring has an arcuate shape.

The present invention enables rapid and simple connection of both the mounting housing and the spring to the stiffening insert. The spring is disposed securely within the insertion opening of the mounting housing in a manner which prevents the spring from being pulled out or turned.

The mounting housing further includes a projection which is located in the second insertion opening and which holds the sun visor shaft. The projection constricts the cross-section of the opening and is snapped into an annular locking groove provided in the end region of the sun visor shaft. The simple plugging of the shaft into the insertion opening completes mounting of the sun visor to the vehicle. The present invention thus provides a dependable axial fastening means with an inexpensive and reduced parts construction. Especially when it is formed of a plastic material, the projection within the insertion opening is inherently resilient, thus enabling simple removal of the shaft from the sun visor body by pulling forcefully on the shaft.

The present invention may be inexpensively manufactured particularly if, as is preferred, the mounting housing is formed of a plastic injection molded piece.

Other features and advantages of the present invention will become apparent from the following description of a preferred embodiment which refers to the accompanying drawings.

BRIEF DESCRIPTION OF THE DRAWINGS

FIG. 1 is an elevational view of a first embodiment of the stiffening insert and mounting housing of the sun visor of the present invention.

FIG. 2 shows the sum visor shaft received in the mounting housing.

FIG. 3 shows the leaf spring in the mounting housing.

FIG. 4 is a longitudinal cross-section through the mounting housing illustrating the location of the leaf spring.

FIG. 5 is a transverse cross-section through the mounting housing.

FIG. 6 is a vertical cross-section through the mounting housing.

DESCRIPTION OF A PREFERRED EMBODIMENT

FIG. 1 shows with a dashed line a foam-plastic sun visor body 1 which is conventionally enveloped by a cover sheet (not shown). Body 1 is stiffened by a two section stiffening wire insert formed of parts 8 and 11. The sun visor body 1 is flat, approximately rectangular and is provided at one corner along its upper longitudinal edge 2 with a mounting housing 3. Mounting housing 3 is preferably a plastic injection molded piece. Mounting housing 3 is embedded in the foam plastic of sun visor body 1 and is connected in a manner described below to the stiffening insert 8, 11.

At the opposite end of upper longitudinal edge 2, sun visor body 1 contains and supports at a recess 4 in the top of body 1 an outer support pin 7 which is designed to be detachably received by an outer support 6 which is disposed in a mounting receiver 5 which is secured to the body of the vehicle (not shown).

The stiffening insert includes a first, straight wire section 8 which extends between mounting housing 3 and outer mounting pin 7 and a second, generally C-shaped bent wire section 11. One end of straight wire section 8 is received in a smaller cross-section insertion opening 9 at the right side end of mounting housing 3. The other end of wire section 8 engages in insertion opening 10 of outer support pin 7. The free ends of the C-shaped bent wire section 11 are respectively fastened to mounting housing 3 and to outer support pin 7, and these connections are detailed below.

Mounting housing 3 has a second larger cross-section insertion opening 12 which is accessible from the opposite, left side end of mounting housing 3 and which is disposed so that the two insertion openings 9 and 12 communicate and in fact are aligned and coaxial. Insertion opening 12 is sized to receive a spring 13 as well as the axle stub 14 of a generally L-shaped sun visor shaft 15 (FIG. 2). Along its upper region, insertion opening 12 (FIG. 5) has a semicircular crosssection and toward its bottom, the opening 12 changes into a rectangular cross-section opening in mounting housing 3. More specifically, insertion opening 12 is bounded by a bottom wall 16, two side walls 17 which extend perpendicularly to and adjoin bottom wall 16, and a semicircular top wall 18. The curvature of top wall 18 is selected to complement the radius of curvature of sun visor shaft 15.

A projection 19 (FIG. 4) projects radially inwardly within insertion opening 12. Projection 19 may have a boss shape or it may be, as shown in FIG. 4, a bead.

A web-shaped extension of material 20 from mounting housing 3 extends perpendicularly down from the main elongated body of the housing. The extension 20 serves to connect mounting housing 3 to bent wire reinforcing section 11 by way of detent lugs 21 which receive wire section 11. Strut 22 connects the far ends of extension 20 and the main body of housing 3 to stiffen and rigidify the mounting housing 3. Several of the detent lugs 21 also are disposed along the longitudinal direction of mounting housing 3 and serve to secure and hold an end section of wire 11 which is reentrantly bent to extend in the longitudinal direction of sun visor body 1.

Mounting housing 3 is molded with a tubular extension 23 which extends away from sun visor body 1 to prevent penetration of foam into insertion opening 12 during fabrication of the sun visor. The extension 23 is subsequently broken off from the final sun visor product.

Spring 13 (FIG. 3) is sized to be received within insertion opening 12. It has a leaf spring construction. A spring tongue 24 at one end is formed of a section reentrantly bent by 180° and the tongue is shaped to allow spring 13 to rest on bottom wall 16. The opposite end of spring 13 has an upwardly bent strap 25 that extends across opening 12 with an insertion hole 26 through it having claws 27 formed therein which are suitable for holding the end of wire section 8 that is inserted in the hole 26. Hole 26 is aligned with insertion opening 9 to enable direct and simple plugging of wire section 8 into spring 13.

Axle stub 14 of sun visor shaft 15 is designed to be inserted into mounting housing 3 through the opening defined at the location where extension 23 was originally connected. When stub 14 of shaft 15 is inside insertion opening 12, projection 19 of mounting housing 3 snaps into annular groove 40 of stub 14. The flat 28 on the underside of stub 14 is engaged by spring 13 when visor body 1 in its non sun-blocking position, usually against the roof of the vehicle.

Outer support pin 7, like mounting housing 3, is also preferably a plastic injection molded piece. It includes a second insertion opening 33 which is sized to receive the second bent end of wire section 11. Extensions 34 of outer support pin 7 extend into the plastic foam material to rigidify and securely anchor support pin 7 is in the plastic foam.

Although the present invention has been described in relation to a specific embodiment thereof, many other variations and modifications will now become apparent to those skilled in the art. It is preferred, therefore, that the present invention be limited not by the specific disclosures herein, but only by the appended claims.

What is claimed is:

1. A mounting housing for connecting a sun visor body to a sun visor shaft, the mounting housing comprising:

a housing body for being embedded in a sun visor body;

a first insertion opening in the housing body for enabling insertion into the housing body of a first end of a stiffening wire associated with the sun visor body;

a second insertion opening in the housing body, communicating with the first insertion opening; and a spring disposed in the second insertion opening, the spring having a sun visor body stiffening wire receiving hole for receiving an end of a stiffening wire of a sun visor body to effect an interconnection between the spring and the stiffening wire.

2. The mounting housing of claim 1, wherein the spring is a leaf spring.

3. The mounting housing of claim 2, wherein the leaf spring has first and second ends, an upwardlybent strap at the first end and extending across the second opening, the stiffening wire receiving hole of the spring being defined in the strap.

4. The mounting housing of claim 3, further comprising claws in the hole for providing firm engagement between the stiffening wire and the spring.

5. The mounting housing of claim 4, further comprising a spring tongue formed at the second end of the spring, the spring tongue being formed of reentrantly bent end section of the spring leaf.

6. The mounting housing of claim 5, wherein the spring leaf is curved in shape between its first and second ends.

7. The mounting housing of claim 2, further comprising a projection which projects from the housing body and which extends into the second insertion opening, the projection being located to snap into an annular groove on the sun visor shaft.

8. The mounting housing of claim 7, wherein the second insertion opening has an initial transverse cross-section defined by a bottom wall, first and second side walls perpendicularly extending to and adjoining the bottom wall, and a semicircularly-shaped top wall adjoining the side walls.

9. The mounting housing body of claim 1, wherein the housing body is comprised of a main elongated body section in which the first and second insertion openings are defined and further includes a body extension extending from the main body section and means on the body extension for connecting a second end of the stiffening wire to the mounting housing.

10. The mounting housing of claim 9, wherein the connecting means commprises detent lugs.

11. The mounting housing of claim 10, wherein the detent lugs further extend along the main body section of the housing body for holding a reentrantly bent and longitudinally extending end section of the stiffening wire.

12. The mounting housing of claim 9, further comprising a strut extending between the main body section and the body extension for rigidifying and stiffening the housing body.

13. The mounting housing of claim 1, wherein the housing body is formed of an injection molded plastic material.

14. The mounting housing of claim 1, wherein the housing body has a longitudinal direction and wherein the first and second insertion openings follow one another and are aligned along the longitudinal direction in the housing body.

15. A sun visor, comprising:

a generally flat and rectangular sun visor body with corners, a stiffening wire extending around and inside the visor body;

a mounting housing disposed in the sun visor body at one of the corners, the mounting housing being suitable for securing the sun visor body to a sun visor support shaft, the mounting housing including:

a housing body for being embedded in a sun visor body;

a first insertion opening in the housing body for enabling insertion into the housing body of a first end of a stiffening wire associated with the sun visor body;

a second insertion opening, communicating with the first insertion opening; and a spring disposed in the second insertion opening, the spring having a stiffening wire receiving hole for receiving the first end of the stiffening wire of the sun visor body to effect an interconnection of the spring, the housing body and the stiffening wire.

16. The sun visor of claim 15, wherein the spring is a leaf spring.

17. The sun visor of claim 16, wherein the leaf spring has first and second ends, an upwardly-bent strap at the first end and extending across the second opening, the stiffening wire receiving hole of the spring being defined in the strap.

18. The sun visor of claim 17, further comprising claws in the hole for providing firm engagement between the stiffening wire and the spring.

19. The sun visor of claim 16, wherein the stiffening wire is comprised of a first wire section and a second wire section and wherein respective first ends of the first and second wire sections are pluggable into the housing body.

20. The sun visor of claim 19, which further comprises an outer support pin which is at least partially embedded in the sun visor body at a location spaced from the mounting housing along one side of the rectangular visor body, the outer support pin comprising third and fourth insertion openings for receiving, respectively, a respective second end of the first and second wire sections.

21. The sun visor of claim 20, wherein the first wire section is comprised of a generally straight wire which extends along the one side of the visor body and the second wire section is comprised of a generally C-shaped wire which extends along the other sides of the visor body.

* * * * *